T. J. ELLISON.
ANIMAL TRAP.
APPLICATION FILED FEB. 19, 1918.
1,267,391.
Patented May 28, 1918.
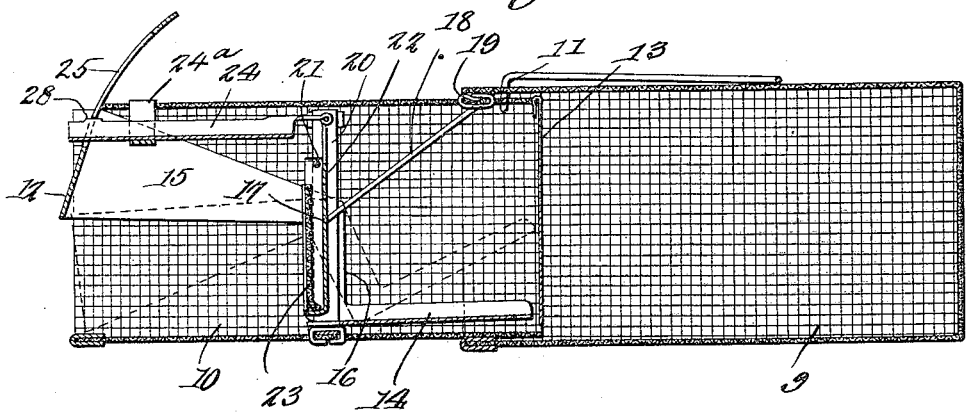
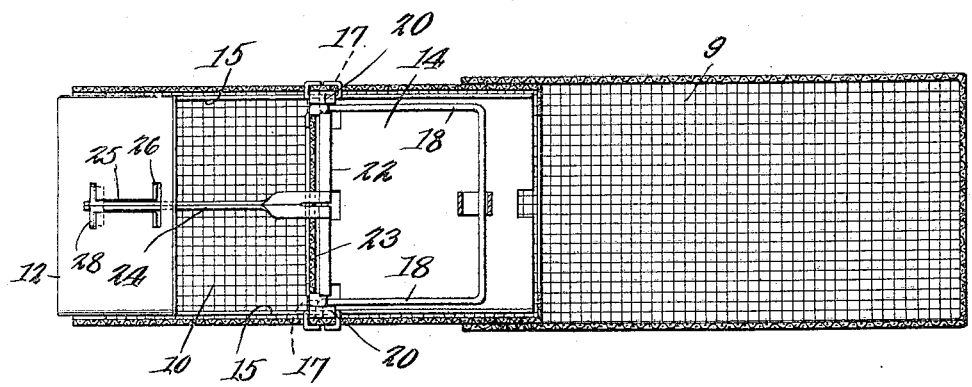
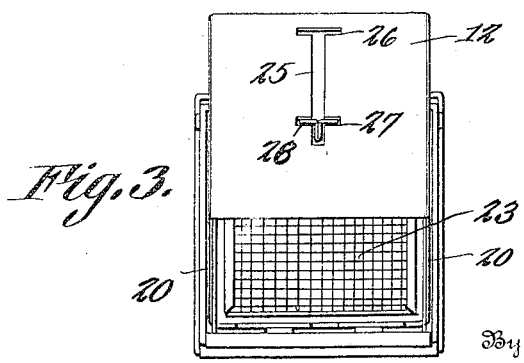
T. J. Ellison
Inventor
By
Attorneys

UNITED STATES PATENT OFFICE.

THOMAS J. ELLISON, OF TERRILL, KENTUCKY.

ANIMAL-TRAP.

1,267,391.  Specification of Letters Patent.  Patented May 28, 1918.

Application filed February 19, 1918. Serial No. 218,084.

*To all whom it may concern:*

Be it known that I, THOMAS J. ELLISON, citizen of the United States, residing at Terrill, in the county of Madison and State of Kentucky, have invented new and useful Improvements in Animal-Traps, of which the following is a specification.

This invention relates to animal traps designed for catching a number of animals in succession, the trap having a mechanism whereby it is reset by the victims.

The object of the present invention is to provide a trap of the kind stated which is highly efficient in operation, and which is comparatively simple in construction and devoid of parts liable to get out of order, and so constructed that numbers of them can be stored in small space by nesting the chambers, one within the other.

The object stated is attained by means of a novel combination and arrangement of parts to be hereinafter described and claimed, and in order that the same may be better understood, reference is had to the accompanying drawing forming a part of this specification.

In the drawing,

Figure 1 is a central longitudinal section of the trap;

Fig. 2 is a plan view of the trap with the top thereof broken away, and

Fig. 3 is a front elevation.

Referring specifically to the drawings the trap has two separate chambers 9 and 10 respectively, the former being designed to hold the victims, and the latter being an entrance chamber having certain closures and resetting mechanism to be presently described. The two chambers are rectangular in contour and they are preferably constructed of wire netting. The victim chamber is entirely closed except at one end, which latter is left open for insertion of the entrance chamber, the latter extending a short distance into the victim chamber, and the two chambers being fastened together by a suitable catch 11. The chambers are thus separably connected, and when the trap is not in use, the entrance chamber may be placed and completely housed in the victim chamber, so that the trap is now in small and compact form for convenient storage and shipment.

The ends of the entrance chamber 10 are open, and at the outer end is a closure in the form of a vertically swinging door 12. The inner end of the chamber 10 which opens into the victim chamber 9 is also provided with a closure in the form of a swinging door 13 hinged to the top of the chamber 10.

In the rear end of the chamber 10 is a vertically tiltable platform 14 extending throughout the entire width of the interior of the chamber. This platform is connected to the door 12 in such a manner that when said door is down and closed, the platform is elevated, and when the platform is depressed, the door swings open. The connection between the platform 14 and the door 12 is made by providing the latter with rearwardly extending side arms 15 having downturned extensions 16 at their rear ends which are connected to the front end of the platform. At the junction of the arms and the extensions thereof, said arms are pivoted to swing in a vertical plane, the pivot being the outturned ends 17 of the branches 18 of a wire bail secured to the top of the chamber 10 by a clip 19. Adjacent to the side walls of the chamber 10 are standards 20 having apertures through which the pivots 17 pass.

The standards 20 are connected at the top by a cross rod 21 from which is pivotally hung a barrier 22 which extends across the inside of the chamber 10 and is free to swing back or forth in a vertical plane, and it is normally in pendent position at the front or entrance end of the platform 14.

The barrier 22 is an imperforate plate provided with a bait receptacle 23 on the side which faces the entrance end of the chamber 10.

The door 12 is held in open and closed positions by a slidable latch bar 24 supported in a guide 24ª on the top of the chamber 10. The forward end of the latch bar seats in a vertical slot 25 in the door 12. At the top of this slot are side keeper recesses 26 and near the bottom of the slot are similar recesses 27. The forward end of the latch bar has retaining lugs 28 extending laterally from its sides and adapted to enter the keeper recesses. When the door 12 is up in open position, the lugs 28 seat in the bottom keeper recesses 27, and when the door is down in closed position, the lugs seat in the top keeper recesses 26.

The trap is set by pushing the latch bar 24 rearward until its lugs 28 clear the recesses 26, which releases the door 12 and allows the same to be swung upward to open position, and it is held in this position by allowing the latch bar to advance until its lugs 28 seat in the recesses 27. The barrier 22 and the platform 14 are now down and the door 13 is also down and closed. The animal, attracted by the bait in the receptacle 23, enters the chamber 10 beneath the elevated door 12, and in attempting to gain access to the bait, swings the barrier 22 rearward. This movement of the barrier advances the latch bar 24 so that its lugs 28 leave the recesses 27, allowing the door 12 to drop and close, the latch bar riding in the slot 25, and the platform 14 rising as shown dotted in Fig. 1. The animal now finding its retreat cut off, pushes forward on the barrier 22 and upon swinging the same open steps on the platform 14 and tilts the same, and upon pushing the door 13 open escapes into the chamber 9. When the platform is depressed or tilted, the door 12 is swung open and so held by the latch bar 24, the trap being now reset and ready for the next victim. Once the animal enters the chamber 9, escape is impossible as the door 13 swings only in one direction, the rear end of the platform abutting against the door and preventing the same from swinging in a direction to permit the animal to leave the chamber 9. The animal cannot reach the bait from the platform and therefore cannot destroy the bait. If the animal should attempt to retreat after stepping on the platform 14, a slight push on the barrier 22 unlatches the door 12 and the latter again closes.

I claim:

1. An animal trap comprising a victim chamber, an entrance chamber opening thereinto, a swinging closure for the entrance chamber, a tiltable platform in said chamber and connected to the closure, a pivoted barrier in the entrance chamber between the closure and the platform, and a latch for the closure operatively connected to the barrier.

2. An animal trap comprising a victim chamber, an entrance chamber opening thereinto, a swinging closure for the entrance chamber, a tiltable platform in said chamber and connected to the closure, a pivoted barrier in the entrance chamber between the closure and the platform, a latch for the closure operatively connected to the barrier, and a bait holder on that side of the barrier which faces the closure.

3. An animal trap comprising a victim chamber, an entrance chamber opening thereinto, a swinging closure for the entrance chamber, a tiltable platform in said chamber and connected to the closure, a pivoted barrier in the entrance chamber between the closure and the platform, a latch for the closure operatively connected to the barrier, and a swinging closure at the outlet end of the entrance chamber into the victim chamber, said closure swinging in one direction only.

4. An animal trap comprising a victim chamber, an entrance chamber opening thereinto, a swinging closure for the entrance chamber, a tiltable platform in said chamber and connected to the closure, a pivoted barrier in the entrance chamber between the closure and the platform, and a slidable latch bar operatively connected to the barrier and engageable with the closure for holding the same in open and closed positions, said closure having a slot in which the latch bar rides, and provided with lateral keeper recesses, and lateral retaining lugs on the latch bar adapted to seat in the recesses.

In testimony whereof I affix my signature.

THOMAS J. ELLISON.

Copies of this patent may be obtained for five cents each, by addressing the "Commissioner of Patents, Washington, D. C."